United States Patent
Iliev et al.

(10) Patent No.: US 10,713,555 B2
(45) Date of Patent: Jul. 14, 2020

(54) UHF RFID TRANSPONDER

(71) Applicant: KATHREIN SACHSEN GMBH, Mühlau (DE)

(72) Inventors: Stoyan Iliev, Rosenheim (DE); Thomas Brunner, Riedering (DE)

(73) Assignee: Katherein Sachsen GmbH, Mühlau (DE)

( * ) Notice: Subject to any disclaimer, the term of this patent is extended or adjusted under 35 U.S.C. 154(b) by 0 days.

(21) Appl. No.: 16/461,299

(22) PCT Filed: Jan. 10, 2018

(86) PCT No.: PCT/DE2018/000006
§ 371 (c)(1),
(2) Date: May 15, 2019

(87) PCT Pub. No.: WO2018/133894
PCT Pub. Date: Jul. 26, 2018

(65) Prior Publication Data
US 2019/0318218 A1 Oct. 17, 2019

(30) Foreign Application Priority Data
Jan. 20, 2017 (DE) .................. 10 2017 000 599

(51) Int. Cl.
*G06K 19/077* (2006.01)
(52) U.S. Cl.
CPC . *G06K 19/07786* (2013.01); *G06K 19/07777* (2013.01)
(58) Field of Classification Search
CPC ........ G06K 19/00; G06K 19/04; G06K 19/06; G06K 19/067; G06K 19/07
(Continued)

(56) References Cited

U.S. PATENT DOCUMENTS 6,285,342 B1 * 9/2001 Brady .............. G06K 19/07749
343/895
9,390,367 B2 * 7/2016 Machado ......... G06K 19/07786
(Continued)

FOREIGN PATENT DOCUMENTS

JP 2007096655 A * 4/2007

OTHER PUBLICATIONS

International Search Report issued in PCT/DE2018/000006 dated May 15, 2018.

*Primary Examiner* — Edwyn Labaze
(74) *Attorney, Agent, or Firm* — Blank Rome LLP

(57) ABSTRACT

The invention relates to a UHF RFID transponder with an antenna and an RFID chip, wherein the antenna has a first dipole structure, a first inductive loop and an infeed point, and the first dipole, the inductive loop and the RFID chip are electrically connected to the infeed point. The purpose of the invention is to create an RFID transponder that can be tuned with reduced influence from the geometric tolerances involved in the production of the antenna. As a result, these RFID transponders are intended to be particularly suitable for attaching to glass panes, as the impedance of the antenna can be tuned to the impedance of the RFID chip with less influence from the thickness or material composition of the glass. This task is achieved in that the antenna (2) has a second inductive loop (8) and that this second inductive loop (8) is electrically connected to the infeed point (3) and connected in parallel to the first inductive loop (7).

7 Claims, 2 Drawing Sheets

Figure 1A:
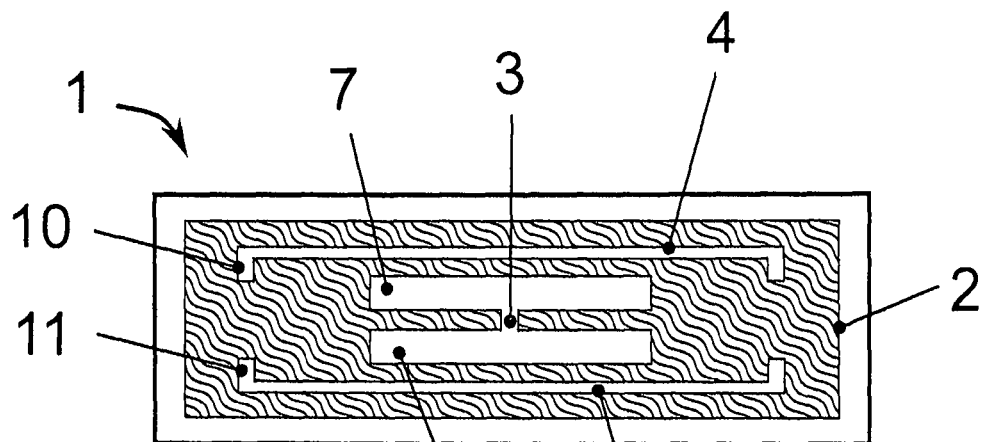

(58) Field of Classification Search
USPC ............................... 235/492, 487, 375, 380
See application file for complete search history.

(56) References Cited

U.S. PATENT DOCUMENTS

| | | | |
|---|---|---|---|
| 2010/0245049 A1* | 9/2010 | Yoshida | G06K 19/07794 340/10.1 |
| 2011/0258894 A1 | 10/2011 | Beenken | |
| 2011/0291836 A1* | 12/2011 | Deavours | G06K 19/07773 340/572.7 |
| 2014/0056368 A1* | 2/2014 | Nakayama | H01Q 23/00 375/256 |
| 2016/0012329 A1 | 1/2016 | Machado et al. | |
| 2016/0275322 A1* | 9/2016 | Carrender | G06K 19/07786 |
| 2016/0321535 A1* | 11/2016 | Ban | G06K 19/07786 |
| 2016/0342883 A1* | 11/2016 | Huhtasalo | G06K 19/07767 |

\* cited by examiner

UHF RFID TRANSPONDER

This application is a national stage of International Patent Application No. PCT/DE2018/000006, filed Jan. 10, 2018, which claims the benefit of German Patent Application 102017000599.0, filed Jan. 20, 2017, each of which is hereby incorporated by reference in its entirety.

The invention relates to a UHF RFID transponder with an antenna and an RFID chip, wherein the antenna has a first dipole structure, a first inductive loop and an infeed point, and the first dipole, the inductive loop and the RFID chip are electrically connected to the infeed point.

UHF RFID systems are one of the best solutions for identifying and tracking objects in real time. Passive UHF RFID technology is particularly well suited to the identification of motor vehicles thanks to its high reading range (greater than 10 m). Using this technology, the information (identification number) of an RFID transponder attached to a motor vehicle can be read wirelessly and from a great distance. This technology can be used, for example, for an automated electronic toll on a motorway without requiring the vehicle to be stationary during the identification process. It also permits contactless registration when entering a car park, for example. RFID transponders generally comprise an RFID chip and an antenna.

To ensure that a passive UHF RFID system performs properly, it is very important that the RFID transponder can be fitted correctly on the motor vehicle. A suitable place for this is the inner side of the windscreen on the motor vehicle. On the one hand, this ensures that the RFID transponder is protected against bad weather conditions; on the other hand, an imprint (such as a licence-plate number) on the RFID transponder can be read from outside. One problematic factor, however, is that the windscreen acts as a dielectric thereby detuning the RFID transponder. The RFID transponder can be tuned for the windscreen by adjusting the impedance of the antenna. However, because the glass materials and glass thicknesses of windscreens vary from manufacturer to manufacturer, an RFID transponder that has been tuned for one windscreen can rarely be used for a windscreen from another manufacturer or for another vehicle type. Another complicating factor when tuning the antenna impedance is that the production tolerances used during the production of the antennae have a significant impact on the performance of the UHF RFID system.

The interaction between glass properties and transponder performance has already been identified in publication WO 00/73990 A1, in which it is suggested that the RFID transponder should be configured for each windscreen. However, the previously mentioned publication does not describe how an RFID transponder can be tuned for various glass panes with different compositions and glass thicknesses.

Within the prior art, antennae are known to feature a dipole or a folded dipole and an inductive loop that is connected in parallel to the same, such as those from EP 1 814 190 B1. The infeed points of the dipoles are electrically connected to the inductive loop, wherein the electrical connection is located on one side of the inductive loop that is facing the dipole. The impedances of these types of antennae consist of a real component and an imaginary component, with the imaginary component being generated by the inductive loop. The complex conjugation of this impedance should be adjusted to the impedance of the RFID chip. One disadvantage with these types of antenna structures is that the tolerances associated with the manufacturing process can lead to deviations from the nominal geometry of the dipole and loop dimensions, which can have a negative impact on the tuning of the impedance of the antenna to the impedance of the RFID chip. The impact of these manufacturing tolerances can be observed in more detail for an RFID transponder that is attached to a glass pane.

The purpose of the invention is to create an RFID transponder that can be tuned with less influence from the geometric tolerances involved in the production of the antenna. In particular, this RFID transponder is intended to be suitable for attaching to glass panes, whereby the impedance of the antenna can be tuned to the impedance of the RFID chip with less influence from the thickness or material composition of the glass.

This is achieved in that the antenna has a second inductive loop of the antenna and that this second inductive loop is electrically connected to the infeed point and connected in parallel to the first inductive loop.

Due to the capacitive nature of the impedance of the RFID chip, the impedance of the antenna is always inductive, which is why a typical antenna features an inductive loop that creates an inductive component of the impedance. The inductance of a round loop with radius $\alpha$ and thickness $l$ is calculated as follows:

$$L = \mu \frac{\pi a^2}{l} \tag{1}$$

This means that the inductance L is proportional to the square of the variable $\alpha$. Depending on the manufacturing process used for the antenna of the RFID transponder, there is always a tolerance with regard to the dimensions, and thus also with regard to the variable $\alpha$. When the etching or metal vapour deposition manufacturing processes are used, typical tolerances of around 50 μm are to be expected. If the antenna is equipped with only one inductive loop, taking the tolerance into account, the inductance is calculated as follows:

$$L = \mu \frac{\pi (a \pm \Delta a)^2}{l} \tag{2}$$

Because $$\mu = \frac{\pi}{l}$$

is a constant, the inductance is proportional to the term $(\alpha \pm \Delta\alpha)^2 = \alpha^2 \pm 2\alpha\Delta\alpha + \Delta\alpha^2$, which means that, in comparison to equation (1), the part of the inductance caused by the tolerance is proportional to $(\pm 2\alpha\Delta\alpha + \Delta\alpha^2)$.

In order to minimise the proportion of the inductance caused by the tolerance, the antenna to which the invention relates is equipped with two parallel inductive loops. The inductance $L_{ges}$ of both loops is calculated as follows:

$$L_{ges} = \frac{L_1 L_2}{(L_1 + L_2)} \tag{3}$$

where $L_1$ and $L_2$ are the inductances of the individual loops.

To ensure that the same inductance is achieved with two loops connected in parallel as would be with one loop with a radius of $\alpha$, the two loops must have a radius of $\alpha\sqrt{2}$.

The inductance of the loops connected in parallel is therefore proportional to $$\frac{(a\sqrt{2} \pm \Delta a)^4}{2(a\sqrt{2} \pm \Delta a)^2} = \frac{(a\sqrt{2} \pm \Delta a)^2}{2} = a^2 \pm \sqrt{2}a\Delta a + \frac{\Delta a^2}{4} \quad (4)$$

The part of the inductance caused by the tolerance is therefore proportional to $$\left( \pm \sqrt{2}a\Delta a + \frac{\Delta a^2}{4} \right) = \Delta a \left( \pm \sqrt{2}a + \frac{\Delta a}{4} \right) \approx \Delta a (\pm \sqrt{2}a)$$

and smaller than the above-mentioned proportion ($\pm 2\alpha\Delta\alpha + \Delta\alpha^2$)=$\Delta\alpha(\pm 2\alpha+\Delta\alpha)\approx\Delta\alpha(\pm 2\alpha)$, because $\Delta\alpha$ is much smaller than $\alpha$ (typically $\alpha$ is around 15 mm, and $\alpha$ is around 50 μm).

If the UHF RFID transponder described in the invention is used on a dielectric (such as a windscreen), it is thus not influenced as greatly by the properties of the dielectric. Therefore, in the case of a windscreen, the impedance of the antenna with two inductive loops can be tuned to the impedance of the RFID chip with reduced influence from the thickness and material composition of the glass. The UHF RFID transponder is also suitable for mounting on a plastic support.

The real component of the impedance of the antenna is primarily generated by the dipole structure, while the imaginary component of the impedance of the antenna is primarily generated by the two loops.

In another configuration, the second inductive loop is arranged as a mirror image across a mirror plane from the first inductive loop, wherein the mirror plane intersects the infeed point and is oriented parallel to a dipole axis of the first dipole structure.

In one version, the first and second inductive loops are arranged in a common plane.

In another version, the antenna has a second dipole structure and this second dipole structure is electrically connected with the infeed point.

In one configuration, the second dipole structure is arranged as a mirror image across a mirror plane from the first dipole structure, wherein the mirror plane intersects the feeding point and is oriented parallel to a dipole axis of the first dipole structure.

In this version, too, the imaginary component of the impedance of the antenna is primarily generated by the two loops. The real component of the impedance of the antenna is primarily generated by the two dipole structures. This configuration also reduces the influence of deviations in the dimensions of the antenna on the impedance of the antenna, which makes the UHF RFID transponder suitable for use on a dielectric.

It is proposed that the first and second dipole structures be designed as folded dipoles.

In one version, the first and second folded dipoles feature slits.

In one version, the slits feature curved ends.

It is proposed that the curved ends of the first dipole structure and the curved ends of the second dipole structure should be pointed towards each other.

In one version, the antenna is produced using a subtractive process on a substrate with a metallic coating or is formed on a substrate using an additive process.

It is also proposed that the UHF RFID transponder should feature a hologram. A hologram attached to the UHF RFID transponder can provide increased security, such as against product counterfeiting.

In one version, the hologram is made of plastic.

Embodiments of the invention are explained by means of drawings below. These show:

FIG. 1a Overhead view of UHF RFID transponder to which the invention relates

Figure 1B:
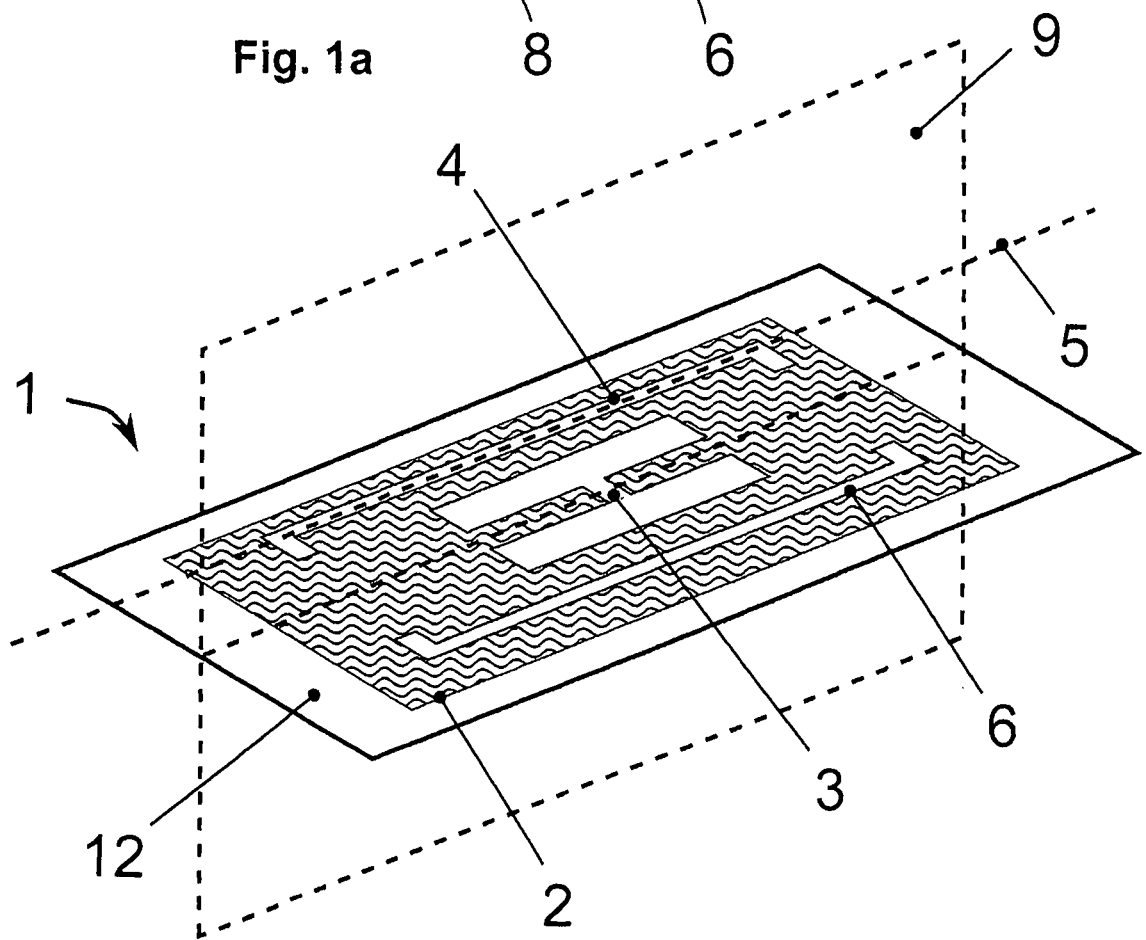

FIG. 1b Spatial depiction of UHF RFID transponder in accordance with FIG. 1a

Figure 2A:
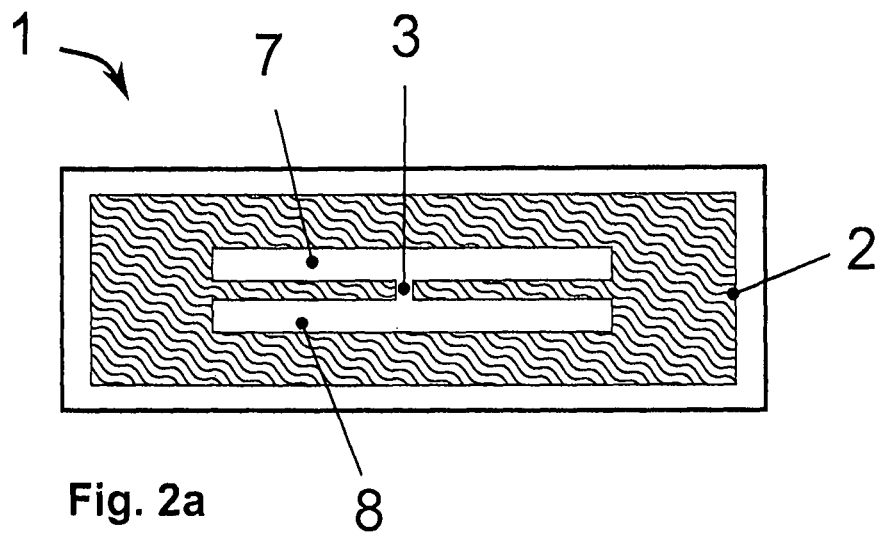
Figure 2B:
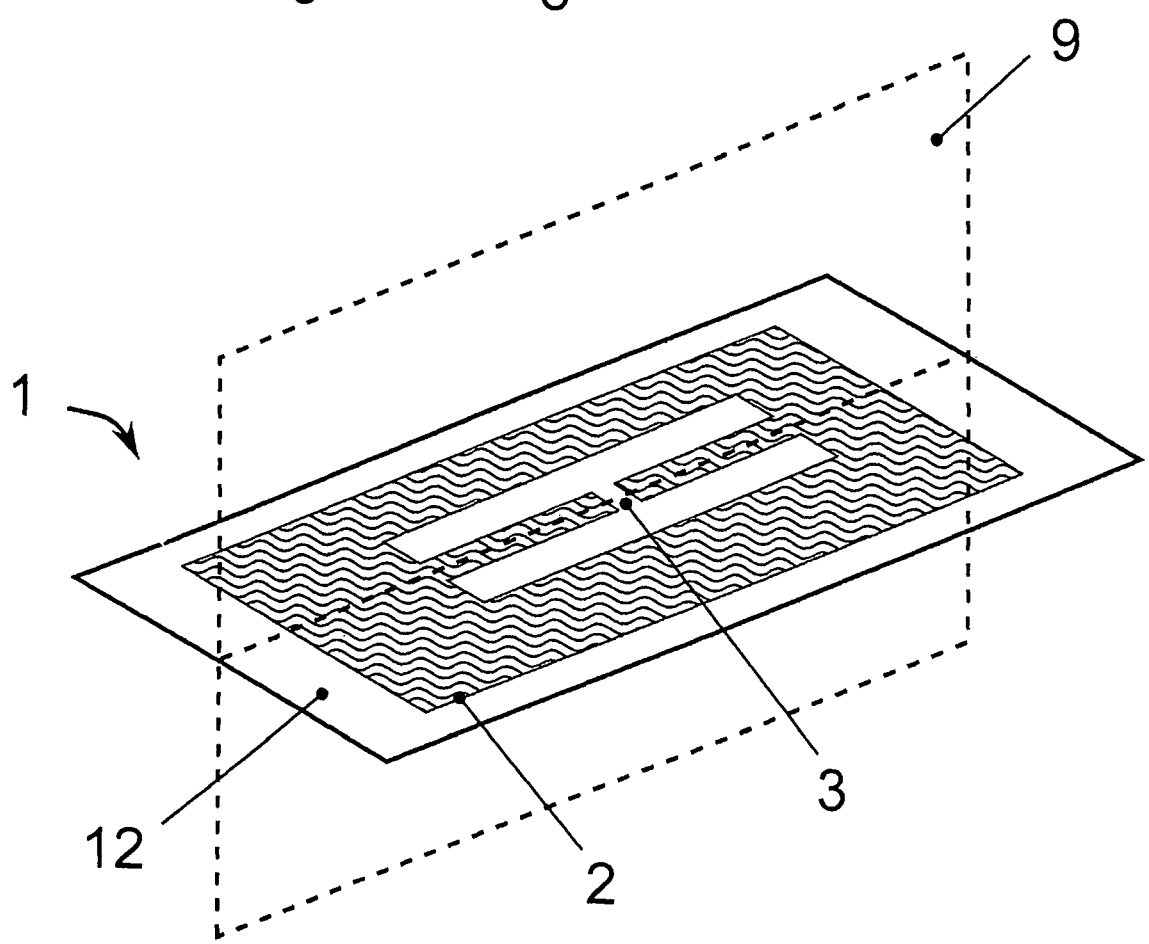

FIG. 2a Overhead view of a further embodiment of a UHF RFID transponder to which the invention relates FIG. 2b Spatial depiction of UHF RFID transponder in accordance with FIG. 2a FIG. 1a and FIG. 1b show the UHF RFID transponder 1 to which the invention relates, with FIG. 1a showing this from an overhead view and FIG. 1b showing a spatial depiction. The UHF RFID transponder 1 features an antenna 2 with an infeed point 3, and the feeding point 3 is connected to an RFID chip. The RFID chip is not shown, however.

The antenna 2 consists of a first dipole structure 4 with a dipole axis 5, a second dipole structure 6, a first inductive loop 7 and a second inductive loop 8, and the dipole structures 4 and 6 and inductive loops 7 and 8 are each electrically connected to the infeed point 3. The second inductive loop 8 is arranged as a mirror image of the first inductive loop 7 reflected in a mirror plane 9, which intersects the infeed point 3 and is parallel to the dipole axis 5. In addition, the first and second inductive loops 7 and 8 are in a common plane and the infeed point is arranged between the two loops 7 and 8. In a space-saving version, the loops have a rectangular shape, whereby the loops can be formed from a rectangular recess in a metallic layer.

The second dipole structure 6 is arranged as a mirror image of the first dipole structure 4 in the mirror plane 9. Both dipole structures 4 and 6 are designed as folded dipoles with slits. These slits feature curved ends 10 and 11, wherein the curved ends 10 of the first dipole structure 4 and the curved ends 11 of the second dipole structure 6 point towards each other. In principle, however, slits without curved ends 10 and 11 or curved ends 10 and 11 oriented differently to the illustration are also conceivable.

The antenna 2 was formed from a plastic film with a metallic coating using a subtractive process; however, the formation of the antenna 2 is not limited to this process. The antenna 2 could also be produced by vapour deposition of a metal on a plastic film substrate 12 with the use of shadow masks, for example. The use of a plastic film is also not essential. For example, paper can also be used as a substrate 12. Another option for manufacturing the antenna 2 is by stamping it from a metal film. The metal film, plastic film or paper substrate can be equipped with an adhesive film, which means that the UHF RFID transponder 1 can be attached to a motor-vehicle windscreen, for example.

FIG. 2a shows a further embodiment of the UHF RFID transponder 1 relating to the invention from an overhead view. FIG. 2b shows the UHF RFID transponder 1 from FIG. 2a in a spatial depiction. The antenna 2 of the UHF RFID transponder 1 is designed with only one dipole structure. As already shown in the embodiment in accordance with FIG. 1b, the second inductive loop 8 is arranged as a mirror image of the first inductive loop 7 reflected in a mirror plane 9, which intersects the infeed point 3 and is parallel to the dipole axis 5. Both loops 7 and 8 are in one plane (substrate plane). The infeed point 3 is located between the two loops 7 and 8.

In the figures, the black areas show the metallic areas of the antenna 2 of the UHF RFID transponder 1.

To increase security—against product counterfeiting, for example—the UHF RFID transponder can be equipped with a hologram. This hologram can be attached to the antenna or to an area close to the antenna, for example. This type of hologram can be made of plastic, for example.

LEGEND

1 UHF RFID transponder
2 Antenna
3 Infeed point
4 Dipole structure
5 Dipole axis
6 Dipole structure
7 Inductive loop
8 Inductive loop
9 Mirror plane
10 End
11 End
12 Substrate

The invention claimed is:

1. A UHF RFID transponder with an antenna and an RFID chip, wherein the antenna has a first dipole structure, a second dipole structure, a first inductive loop, a second inductive loop and an infeed point, wherein the first dipole structure and the second dipole structure are folded dipoles, and wherein the first dipole structure, the second dipole structure, the first inductive loop, the second inductive loop and the RFID chip are electrically connected to the infeed point, wherein the second inductive loop is connected in parallel to the first inductive loop, wherein the dipole structures designed as folded dipoles, each featuring a slit that is parallel to one long side of the antenna, and each slit having curved ends, and wherein the curved ends of the first dipole structure and the curved ends of the second dipole structure are turned towards each other.

2. The UHF RFID transponder of claim 1, wherein the second inductive loop is arranged as a mirror image of the first inductive loop in a mirror plane, wherein the mirror plane intersects the infeed point and is parallel to a dipole axis of the first dipole structure.

3. The UHF RFID transponder of claim 1, wherein the first and second inductive loops are arranged in a common plane.

4. The UHF RFID transponder of claim 1, wherein the second dipole structure is arranged as a mirror image of the first dipole structure in a mirror plane, wherein the mirror plane intersects the infeed point and is parallel to a dipole axis of the first dipole structure.

5. The UHF RFID transponder of claim 1, wherein the antenna is produced using a subtractive process on a substrate with a metallic coating or using an additive process on a substrate.

6. The UHF RFID transponder of claim 1, wherein the UHF RFID transponder features a hologram.

7. The UHF RFID transponder according to of claim 6, wherein the hologram is made of plastic.

* * * * *

UNITED STATES PATENT AND TRADEMARK OFFICE
CERTIFICATE OF CORRECTION

| | |
|---|---|
| PATENT NO. | : 10,713,555 B2 |
| APPLICATION NO. | : 16/461299 |
| DATED | : July 14, 2020 |
| INVENTOR(S) | : Stoyan Iliev et al. |

It is certified that error appears in the above-identified patent and that said Letters Patent is hereby corrected as shown below:

On the Title Page

In Assignee (73), delete:
"KATHEREIN SACHSEN GMBH"
And replace with:
-- KATHREIN SACHSEN GMBH --

Signed and Sealed this
Eighteenth Day of August, 2020

Andrei Iancu
*Director of the United States Patent and Trademark Office*